(No Model.)

A. F. CARLSON.
INSECT TRAP FOR TREES, &c.

No. 529,643. Patented Nov. 20, 1894.

Witnesses

Inventor
A. F. Carlson
By Alexander & Davis
Attorneys

UNITED STATES PATENT OFFICE.

ADOLPH F. CARLSON, OF ATTICA, INDIANA.

INSECT-TRAP FOR TREES, &c.

SPECIFICATION forming part of Letters Patent No. 529,643, dated November 20, 1894.

Application filed March 2, 1894. Serial No. 502,147. (No model.)

*To all whom it may concern:*

Be it known that I, ADOLPH F. CARLSON, a citizen of the United States, residing at Attica, in the county of Fountain and State of Indiana, have invented certain new and useful Improvements in Insect-Traps for Trees, &c., of which the following is a specification, reference being had therein to the accompanying drawings, in which—

Figure 1:
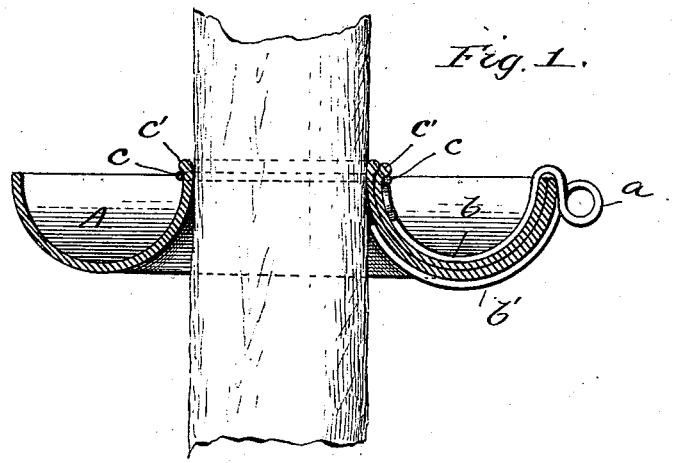
Figure 2:
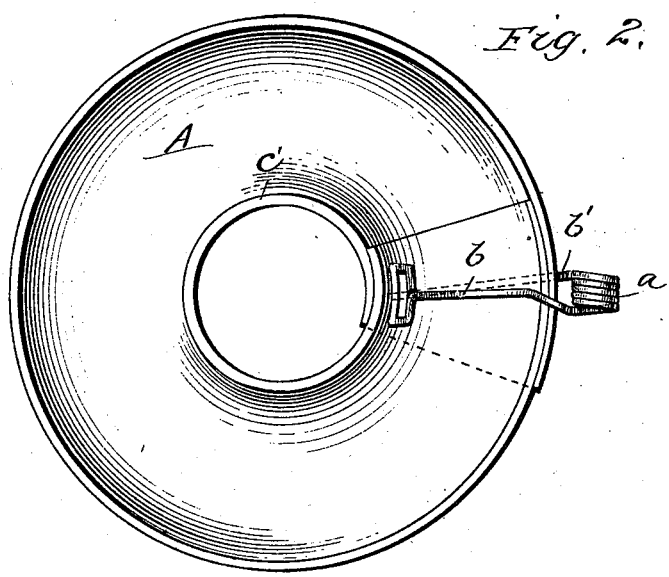
Figure 3:
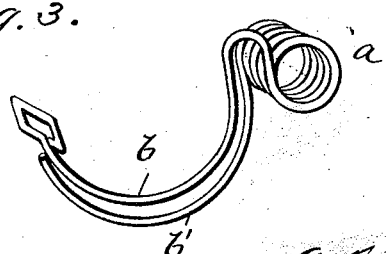

Figure 1 designates a vertical sectional view of the device applied to the trunk of the tree; Fig. 2, a plan view of the device detached, and Fig. 3 a detail view of the removable spring-clamp.

This invention relates to that class of tree protectors which are constructed of a circular adjustable trough adapted to clasp the trunk of the tree and to hold a suitable liquid, the liquid forming an impassable barrier to crawling insects and thereby preventing them ascending the tree trunk, substantially as more fully hereinafter described.

My trap or fountain consists essentially of a circular gutter or trough A formed of a single band of a suitable pliable and water proof material, such as rubber, leather, paper, &c. The adjoining ends of the trough overlap each other thereby forming a continuous gutter around the tree. The over-lapped ends of the flexible trough are securely but adjustably clamped together by means of a spring clamp, which consists of a single piece of spring-wire bent into a spring-coil $a$ about midway its length and having one of its free ends bent into a curved clamping-arm $b$ which is adapted to fit within the interior of the trough and extend entirely across the same and its other arm $b'$ bent into a similar shape and adapted to conform to the exterior of the trough as shown, the two clamping arms being bent laterally so as to come approximately in the same vertical plane. The tendency of the clamping arms is to spring together, so that when sprung over the over-lapped joint they serve to bring the over-lapped parts closely together to form a water tight joint. The trough is applied to the tree trunk by spreading the joint and passing it over the trunk. The trough is then closed tightly around the trunk with the ends over-lapping as shown. It is then secured to the tree by tying or placing a band $c$ around its inner portion, an annular flange $c'$ being formed around the upper edge of this portion to retain the band or cord in place. The over-lapped ends of the trough are then clamped tightly together by the spring-clamp, a small amount of cement having been placed between the over-lapped parts of the trough to assist in making the joint water tight.

It will be observed that this fountain is very simple and practical in construction and may be readily adjusted to various sized trees. It is obvious that the flexible trough may be made of one or more pieces as may be desired.

It is obvious that this device may be used with equal advantages upon the legs of furniture to prevent crawling insects from ascending the legs.

Having thus fully described my invention, what I claim is—

1. An insect trap consisting of a circular pliable trough having its ends overlapped, and a removable clamp consisting of a pair of spring arms, one fitting within the trough and the other against the under side of the same, and a spring coil connecting said arms and adapted to normally press them toward each other, substantially as described.

2. An insect trap consisting of a circular trough having its ends overlapped, and a clamp consisting of a pair of spring arms normally pressing toward each other, one of the arms fitting within the trough and conforming thereto and the other passing under the trough and conforming thereto, and a connection connecting the outer ends of the arms beyond the trough, substantially as described.

In testimony whereof I affix my signature in presence of two witnesses.

ADOLPH F. CARLSON.

Witnesses:
ALBERT SCHOONOVER,
I. E. SCHOONOVER.